United States Patent Office 2,887,165
Patented May 19, 1959

2,887,165

HYDRAULICALLY OPERATED HITCH DEVICE

Daniel C. Heitshu and Bernard F. Vogelaar, Moline, Ill., assignors, by mesne assignments, to Deere & Company, a corporation of Delaware Continuation of application Serial No. 278,032, March 22, 1952. This application June 6, 1956, Serial No. 589,609

28 Claims. (Cl. 172—9)

This application is a continuation of copending application Ser. No. 278,032, filed March 22, 1952, now abandoned, and the invention relates generally to agricultural implements and more particularly to devices for connecting a ground-working or ground-contacting implement or the like to a tractor, in which pitch-compensating means is provided for maintaining the implement in a position generally parallel to the ground surface at all times at different depths or positions of operation, irrespective of the pitch of the tractor as it passes over uneven terrain, as through swales, over ridges, or the like.

The object and general nature of the invention is the provision of means deriving energy from the tractor power lift system for adjusting or modifying the pitch-compensating means in accordance with adjustments made in the hitch linkage to secure changes in the depth or position of operation of the implement. Another feature of this invention is the provision of means in a conventional three-element hitch linkage acting through and/or deriving energy from the tractor power lift system for extending the upper or compression link whenever the implement is raised into its transport position, irrespective of the position of the pitch-compensating valve and/or other implement position-responsive means, with the upper link extending means so constructed and arranged in or connected with the tractor power lift system that the extension of the upper link when the implement is raised into a transport position, and the resulting movement of the pitch-compensating valve or other means, do not prevent the release of pressure in the high-pressure part of the power lift system when the movement of the implement into its transport position has been completed. A further feature of this invention is the combination with a hydraulic power lift arrangement, including implement-position-responsive means, of means whereby both the pitch-compensating cut-outs means and the depth-adjusting mechanism for the pitch-compensating unit are incorporated in and utilize certain portions of the tractor power lift apparatus in a new and improved manner.

Further and more detailed objects and features of this invention will be apparent from the following detailed description and accompanying drawings, in which:

Figure 4 is a fragmentary diagrammatic view, illustrating a portion of the load- or draft-control mechanism.

Figure 1:
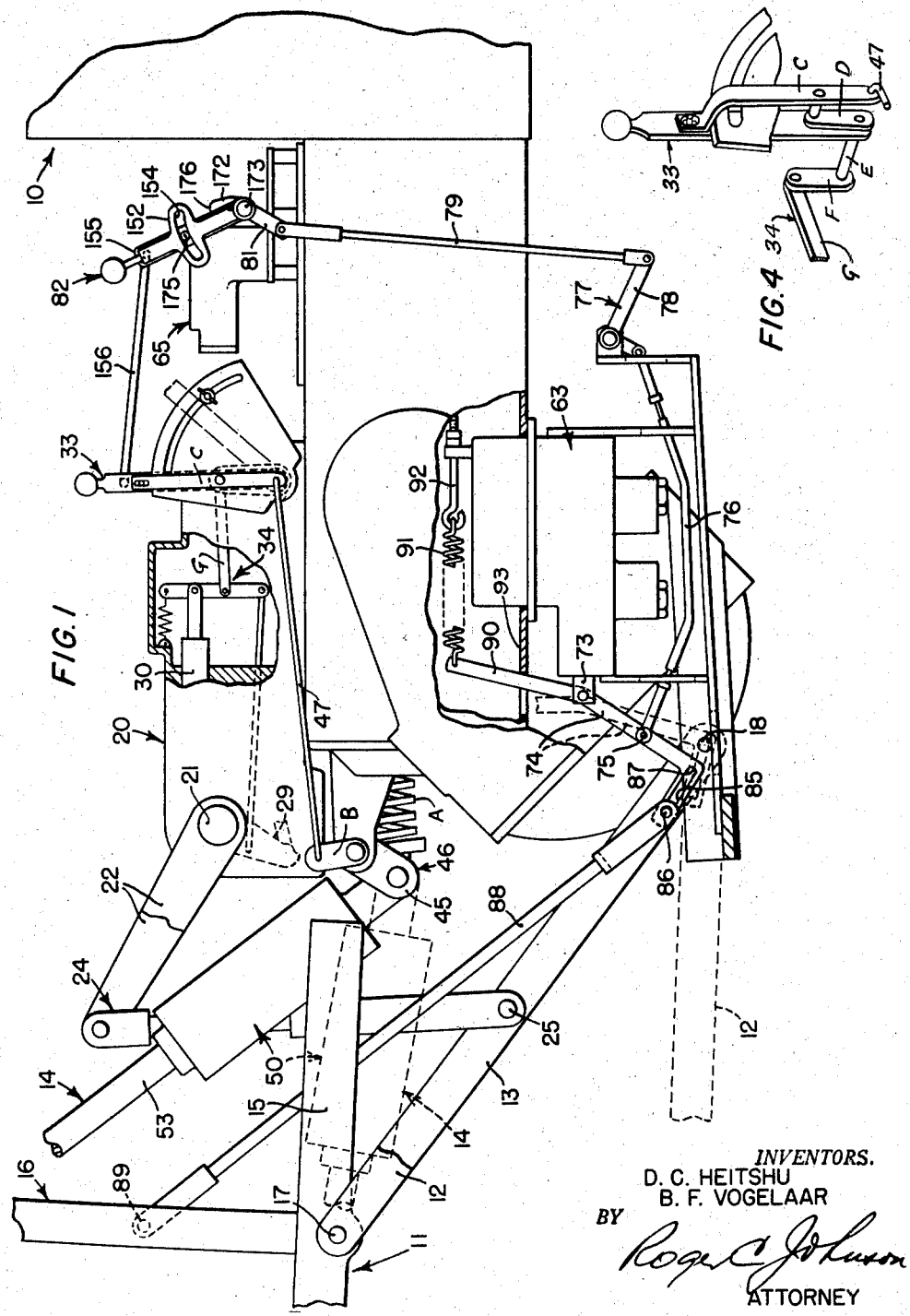
Figure 1 is a fragmentary side view showing a tractor and implement and hitch and control mechanism embodying the invention.

The means chosen to illustrate the principles of the present invention is a tractor and implement outfit comprising a tractor 10, an implement 11, preferably in the form of a multi-bottom plow, and draft linkage means including a pair of lower tension links 12 and 13 and an upper compression link 14 connecting the implement 11 with the rear portion of the tractor. The implement 11 may be of any conventional ground-engaging or ground-working type and for purposes of illustration is shown as including a plow frame 15 equipped with one or more plow bottoms (not shown) and a mast 16 to the upper portion of which the rear end of the upper link means 14 is pivotally connected. The frame 15 also carries a crossbar 17 to which the rear ends of the lower tension links 12 and 13 are pivotally connected. The forward ends of the links 12 and 13 are connected at 18 to laterally spaced apart points on the tractor.

The tractor 10 has a power lift mechanism 20 which may be any conventional hydraulic type such as that shown in U.S. Patent 2,477,410 to Worstell, issued August 2, 1949. For purposes of illustration, the lift mechanism 20 is shown as including a transverse rockshaft 21 supported at the rear of the tractor and having rearwardly extending arms 22 fixed to the ends thereof. The lift arms 22 are pivotally connected through links 24 with the draft links 12 and 13 at 25. Carried within the body of the tractor is a power lift cylinder 27 within which a piston 28 is movable to drive an arm 29 that is fixed to the central portion of the rockshaft 21. Valve mechanism 30 controls the flow of fluid under pressure to the cylinder 27 from a hydraulic pump 31 or other suitable source of pressure fluid, and this valve is under the combined control of a manually operated control lever 33, that is movable through two ranges, one constituting a depth-adjusting range and the other a lifting range, and a follow-up linkage 34 interconnected between the control lever 33 and the arm 29 or some other part movable therewith. The implement is lowered into operating position by swinging the hand lever downwardly and forwardly, as to or beyond the dotted-line position shown in Figure 1. This movement of the lever 33 moves the valve 30 forwardly, beyond the positions shown in Figures 2 and 3, causing a cam section 38 on the valve 30 to open the check valve 39, whereupon oil flows out of the cylinder 27 through a port 41 (Figure 2) and through a central port 41a in the rear end of the valve 30 to the sump in the power lift casing and into the low pressure line 117. For raising of the implement, the pump 31 draws oil or other hydraulic fluid from a reservoir 42 and directs it into a high-pressure line or conduit 43.

The front end of the upper link 14 is connected with the movable bell crank portion 45 of a load- or draft-responsive mechanism 46 that is connected by a link 47 to the follow-up linkage 34. The present invention is not concerned with the particular details per se of the mechanism 46. It suffices, therefore, to note that the bell crank portion 45 acts against a load-resisting spring A, and when the thrust in the upper link 14 becomes sufficient to overcome the spring A an arm B, fixed to move with the part 45, shifts the link 47. As shown in Figure 4, the front end of link 47 is connected to the lower end of a lever C, the upper end of which is slotted and is fulcrumed on the hand lever 33, and when the latter is held stationary, as shown in Figure 1, the aforesaid movement of the lever C acts through an arm D on a shaft E to shift an arm F to which a link G, forming a part of the follow-up linkage 34 mentioned above, is connected. Thus, when the load on thrust link 14 becomes excessive the valve 30 is shifted to cause the power lift 20 to raise the implement. If, on the other hand, the thrust exerted in operation through link 14 against part 45 falls below normal, the spring A expands and, as a result, link 47 acts in the other direction through the follow-up linkage 34 to cause the valve 30 to permit oil to flow out of the cylinder 27. This provides for lowering of the implement.

In any conventional three-element linkage, as shown here, the upper and lower links, as at 14 and 12 and 13 here, are arranged in forwardly converging relation and provide a virtual pivot point, well forward with respect to the tractor, about which the implement 11 may be considered to move; and it is characteristic of such linkage that when the tractor pitches relative to the implement incident to the tractor and implement outfit passing over ridges or through swales or the like, relatively long implements, such as a three-bottom plow or the like, tend to run too deep or to run out of the ground, respectively, and do not hold to the proper depth of operation. Correction of this defect can be achieved by pitch-compensating means, such as that which forms the subject matter of copending application Serial No. 589,796, filed June 6, 1956 as a continuation of abandoned application Serial No. 272,099, filed Feb. 18, 1952. The basic concept there is adopted here by incorporating in the upper link 14 a hydraulic ram 50 in the form of a cylinder 51 and a piston 52 connected through a rod 53 with the upper end of the implement mast 16, and suitable valve means, to be presently described, to selectively extend or retract the ram unit 50 for respectively incurring increase or decrease in the effective length of the upper link 14 to adjust the implement fore-and-aft to compensate for pitching of the tractor; for example, when the outfit travels through a depression or swale, the plow or other tool is kept from running out of the ground at its front end because the upper link is shortened, and when the outfit passes over a rise or ridge, the upper link means is automatically extended, which prevents the front end of the plow from running too deep.

It is one object of the present invention to provide new and improved mechanism for changing or modifying the implement control effected by the pitch-compensating means, which new and improved mechanism is preferably incorporated in or associated structurally with the tractor power lift mechanism and which responds to or is actuated by, first, the adjustment of the tractor power lift means to vary the depth or position of operation of the implement, and second, the operation of the tractor power lift means to raise the implement into a transport position.

Figure 2:
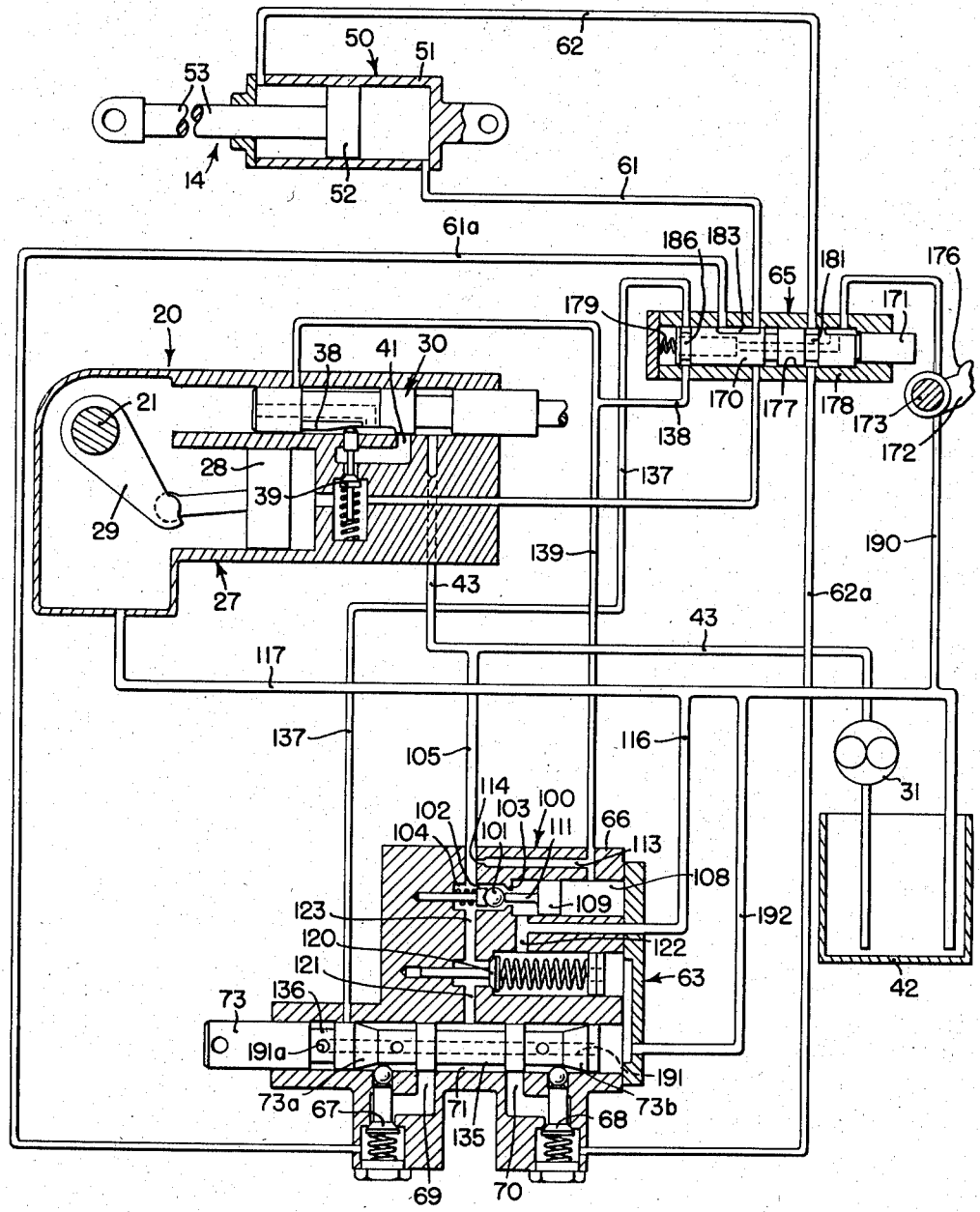
Figure 2 is a diagrammatic view, partly in section, showing the relations and connections between the main control valve, the pitch-compensating valve and the pitch-compensating cut-out mechanism in their normal or implement-operating positions.

As shown in Figure 2, two pressure lines 61 and 62 lead respectively from the front and rear ends of the cylinder 51 to a pitch cylinder control valve unit 63. Specifically, the lines 61 and 62 lead into a lift-operated shunt valve 65, which will be referred to below in detail, and are continued, as at 61a and 62a, from the shunt valve unit 65 to the pitch cylinder control valve 63, leading thence into a housing 66 of the valve 63 respectively through check valves 67 and 68 which control the flow of fluid from the lines 61a and 62a through ports 69 and 70 into a pitch cylinder control valve chamber or bore 71. Movable in the valve chamber 71 is a valve member 73 which, at one end, extends outwardly of the housing 66 and is pivotally connected to a lever 74 (Figure 1) that is pivotally connected at 75 to a shiftable fulcrum member in the form of a fore-and-aft movable link 76. The link or member 76 is connected, at the end opposite the lever 74, with a bell crank 77, one arm 78 of which is connected through a link 79 with an arm 81 that forms a part of an auxiliary manually operated control lever 82. The pitch cylinder control valve operating lever 74 has a slotted extension 85 at its lower end which receives a front end pivot pin 86 of a pitch cylinder control valve operating link member 88, the rear end of which is pivotally connected at 89 in any suitable way to the implement mast 16 at a point spaced from the fore-and-aft tilting axis 17 at the rear ends of the lower draft or tension links 12 and 13. Above the rear end of the pitch cylinder control valve, the valve operating lever 74 is provided with an extension 90 to which one end of a spring 91 is connected, the other end of the spring 91 being anchored in any suitable position, as by an adjustable eye bolt 92, to an extension on the valve housing 66. Forward movement of the portion 90 of the lever 74 under the pull of the spring 91 is limited by contact of the section 90 with any convenient abutment, such as a part 93 on the tractor 10, as shown in Figure 1. The part 93 thus constitutes stop means for the lever 74.

The pitch cylinder control valve housing 66 also carries a demand or unloading valve unit 100 which serves as a part of the tractor power lift system inasmuch as it functions, whenever the lift valve 30 is in its neutral position and no other demand is made upon the pump 31 of the hydraulic power lift system of the tractor for pressure fluid, to open the pressure line 43, leading from the pump 31 to the lift valve 30, to the reservoir.

According to the principles of the present invention, the demand valve means 100, although serving as a part of the tractor power lift system, is incorporated in the pitch-compensating valve housing 66 and includes a ball valve 101 operating in a valve chamber 102 and pressed toward its valve seat 103 by a spring 104. The valve chamber 102 is connected through a pressure line 105 with the pressure line 43. Also disposed in the pitch cylinder control valve housing 66 is a cylinder 108 in which a piston 109 of relatively large area is movable, and a stem 111 on the piston 109 extends into the valve seat 103 in a position to engage the ball valve 101. A passage 113 leads from the cylinder 108 to the auxiliary pressure line 105 through an orifice 114.

When the power lift valve 30 is closed, as in Figure 2, and no other demand is made upon the pressure system for fluid under pressure, the continued operation of the pump 31 builds up pressure in the pressure lines 43 and 105, and by virtue of the fluid under pressure flowing through the restricted orifice 114, pressure is built up in the cylinder 108 which acts against the relatively large piston 109 to unseat the relatively smaller ball valve 101 and thus to reduce the pressure against which the pump 31 operates, since fluid may flow relatively freely past the open ball valve 101 and through a low-pressure line 116 to the low-pressure line 117 that leads from the sump of the cylinder 27 to the reservoir 42.

A high-pressure relief valve 120 in the housing 66 communicates with the high-pressure line 105 through a port 123 and with the reservoir lines 116 and 117 through a port 122. The high-pressure line 105 is in communication with the pitch cylinder control valve chamber 71 through the ports 121 and 123.

In normal operating position, the positions of the manual control lever 33, the pitch-compensating valve lever 74 and the upper and lower links 12, 13 and 14 are substantially as shown in dotted lines in Figure 1.

Whenever, as during operation over uneven terrain, the implement 11 swings relative to the rear ends of the draft links 12 and 13, about the axis defined by the member 17, the control valve link 88 is shifted generally fore-and-aft. For example, when the outfit passes through a depression or swale, the front end of the tractor pitches upwardly relative to the general position of the implement, and this causes the link 88 to be pulled rearwardly and the spring 91 rocks the valve operating lever 74 clockwise about its pivot 75 and pushes forwardly on the pitch cylinder control valve 73. The valve 73 then occupies a forward position (Figure 3) in which the check valve 67 is positively opened by the left-hand camming surface 73a (Fig. 2) and a groove 135 in the valve 73 connects the high-pressure port 121 in the pitch cylinder control valve housing 66 to the port 70 for incurring pressure opening of the check valve 68 to the line 62a which now leads through the shunt valve unit 65 (via port 181 therein, shunt valve 171 being in the position shown in Fig. 2) and into the passageway 62 to the rear end of the pitch cylinder 51. At the same time, an annular chamber or groove 136 in the rear portion of the valve 73 has moved into communication with a line or passageway 137 (Fig. 3) leading through the shunt valve unit 65 (through port 186, Fig. 2) to a second line or passageway 138 that is connected through a line or conduit 139 to the demand valve cylinder 108. As shown in Figure 2, the chamber 136 in the valve member 73 communicates through inner ports 191 and 191a with a reservoir conduit or exhaust line 192. The release of fluid from the demand valve chamber 108 via 191—191a exceeds the supply at the orifice 114 and the spring 104 then closes the demand valve 101. The pump 31 then forces fluid through the conduits 43, 105, 123 and 121, valve groove 135, port 70, past check valve 68, and through lines 62a and 62 and shunt valve port 181 (Fig. 2) into the rear end of the pitch-compensating cylinder 51. Fluid from the front end of the cylinder 51 passes through the conduit 61, port 183 and conduit 61a, past the opened check valve 67 (see Figure 3) and through the port 69, valve bore 191, and conduit 192 to the reservoir 42.

Therefore, when the tractor and implement outfit passes through a depression or swale, power is applied to the upper link adjusting unit 50 to retract or shorten the same, whereupon the plow or other implement is tipped forwardly, or downwardly at the front end and upwardly at the rear end, so as to place the implement in a position substantially parallel to the surface of the ground. This movement of the implement shifts the link 88 forwardly to restore the valve 73 to its neutral or central position, which hydraulically locks the piston 52 in its new position in the cylinder 51 and blocks off any further flow of fluid from the demand valve cylinder 108, which causes the demand valve 101 to open. As a result, the depth or position of operation is maintained substantially uniform, particularly as between the front and rearmost bottoms thereof if the implement 11 is a multi-bottom plow.

The above condition obtains so long as the outfit is passing through a depression or swale, but when the outfit again reaches level ground the implement pivots in the opposite direction relative to the draft links and tractor and resulting rearward movement of the pitch cylinder control valve 73 from its neutral or central position (Figure 2) in the rearward direction results in the closing of the demand valve 101 and the opening of the lines 61a and 61 to the pressure line 43, 105, 121, 135, 69 from the pump 31, whereby fluid under pressure is directed to the front end of the pitch cylinder 51, thereby extending the upper link means 14 and restoring it to normal length. When the control valve 73 is moved rearwardly, the camming surface 73b acts to open the associated check valve 68, whereby fluid may flow from the rear end of the cylinder 51 through the lines 62 and 62a, past the check valve 68 and through the line 192 to the reservoir.

Substantially the reverse of the above described actions takes place when the outfit passes over a ridge or rise. That is, as the front end of the tractor drops when the tractor passes over the crest of the ridge or rise, the tools momentarily operate at reduced depth. This results in a decrease in draft and as a consequence thereof the valve 30 releases fluid from the cylinder 27 and lowers the implement. As the implement thus lowers, a thrust is exerted through the link 88, and as a result of this movement of the link 88, the action of the pitch control cylinder and piston unit is first to extend the upper link means and, then as the tractor and implement outfit reaches level ground again, the upper link means is shortened or brought back to its normal position.

The action of the automatic means for extending and retracting the upper link means 14 as the tractor pitches or as the implement changes its position relative to the lower draft links 12 and 13, is, in effect, to cause the implement as a unit to swing relative to the tractor generally about a transverse axis. The parts are so constructed and arranged that this axis of pivoting lies in the position, relative to the tractor, that secures the optimum operation for the particular implement involved. For example, as is illustrated in Figure 1, the effective pivot axis, about which the implement, when adjusted by the pitch-compensating means, will swing relative to the tractor, lies substantially in the transverse line that extends through the pivots 18 and the point of pivotal connection of the pitch cylinder control rod 88 with the pitch cylinder control valve operating lever 74, which point lines normally at the forward end 87 of the slot in the portion 85 of the lever 74.

If the implement is displaced relative to the draft links 12 and 13 so that the front end of the valve controlling link 88 is shifted either forwardly or rearwardly, the pitch cylinder control valve 73 is actuated so as to adjust the effective length of the upper link means 14 and restore the hitch parts to their normal position so that the forward end of the link 88 is brought back into a position substantially coinciding with the aforesaid axis, or whatever axis is selected for best operation. Hence the implement operates in a level position substantially only at one depth of operation, yet the control lever 33 provides for different depths of operation, merely by shifting the control lever through its depth-adjusting range.

The invention provides means also incorporated in or cooperating with the tractor power lift system for changing the relation between the link 88 and the valve 73 so that the implement may be operated in a level position and normally maintained in that position at widely different depths of adjustment, which is here achieved by adjustment of the effective length of the link 88 according to changes in the depth of operation so as to bring the control valve 73 back to its neutral position in different positions of the implement relative to the draft links 12 and 13, which correspond to different positions of operating depth.

Specifically, the desired result follows from fore-and-aft adjustment of the fulcrum 75 via the bell crank 77, the link 79 and the arm 81 on the auxiliary control lever member 82, plus means for adjusting the lever 82 relative to the lever 33. For this purpose, the lever 82 has a portion 152 formed with a fore-and-aft slot 154 which receives bolt means 175 carried by a coaxial separate lever arm 155 that is connected through a link 156 with the power lift control lever 33. When the bolt means 175 is tightened, the arms 33, 82 and 155 are movable in unison; when the bolt means is loosened, the lever arm 82 is rockable relative to the arms 33 and 155. Once an appropriate adjustment is made, it is secured by tightening the bolt means.

In normal operation, the tractor hydraulic lift control lever 33 is movable to different positions through-out its depth-adjusting range for changing the depth of operation of the implement through actuation of the lift valve 30 and the resultant movement of the piston 28 into different positions to raise or lower the lower links 12 and 13; and the operative connection between the pitch cylinder control valve 73 and the pitch cylinder control valve operating link 88 is changed proportionately, whereby the implement operates in a substantially level position at the selected depth. Thus, using power derived from the hydraulic system of the tractor, the invention contemplates, in addition to adjusting the effective length of the upper link 14 for maintaining the implement in a position substantially parallel to the ground surface when the outfit passes through swales, over ridges or the like, the feature of means responsive to changes in the tractor-carried depth-adjusting mechanism 20 for holding the implement position generally parallel to the ground surface at different depths of operation, and to perform such adjustment automatically, since the interconnection between the pitch cylinder control valve link 88 and the pitch cylinder control valve 73 is automatically changed when the control lever 33 of the tractor is shifted to produce a change in the operating depth of the implement.

In any outfit equipped with conventional draft or load control means, of which that disclosed here at 46 may be considered typical, the manual control, such as the lever 33, initially selects the depth at which the implement will operate and the unit 46 thereafter automatically controls movements of the power lift valve 30 in response to changes in the load transmitted to the bell crank means 45 by the upper link means 14. Action of the lift valve 30 is therefore made responsive to both the lever 33 and variations in the draft of the implement, and actuation of the valve 30, in one direction or the other, causes the piston 28 to be moved outwardly or inwardly, which results in raising and lowering movement transmitted through the lift arms 22 to the lower draft links 12 and 13. However, this movement does not cause any change in the position of the fulcrum member 76 and, further, the pitch cylinder control valve 73 is not made as sensitive to changes in the position of the pitch cylinder control valve link 88 as the lift valve 30 is sensitive to changes in the amount of draft or load imposed on the bell crank means 45. Therefore, within the limits just mentioned, when the draft-responsive mechanism of the tractor acts to raise and lower the implement, so as to compensate for increased or decreased soil resistance, the pitch-compensating unit 50 is not brought into action; instead, the implement as a whole moves, in response to changes in the draft, about a forward virtual pivot point that lies at the point of intersection of the lines extending forwardly through the lower and upper links 12, 13 and 14. While thus responding to changes in the draft, within the limits of the sensitivity of the pitch cylinder control valve, the implement is not theoretically exactly level at the momentarily new depth of operation. However, if the changes are such as to exceed the limits just mentioned, then the pitch-compensating mechanism comes into action and automatically pivots the implement about the pitch-compensating pivot point.

According to the principles of the present invention, as so far described, making use of energy derived from the tractor power lift apparatus, the implement moves generally as a unit about a generally transverse axis as the tractor pitches upwardly or downwardly when passing over ridges or rises or through swales, depressions or the like, and also moves generally about said axis when the tractor power lift mechanism responds to changes in the amount of draft, except that the implement moves about the aforesaid virtual pivot point when the draft-responsive mechanism operates within the limits of insensibility of the pitch-compensating mechanism. However, a somewhat different action is desirable when lifting the implement into a transport position entirely out of contact with the ground. In order to facilitate lifting the implement, such as a plow or the like, into its transport position, it is desirable to override the pitch-compensating mechanism and, whenever the control lever 33 is shifted into its implement transport position, to extend the upper link means 14 immediately its maximum amount so as to tilt the implement rearwardly and thus cause the ground-working tools to run out of the ground more readily than merely raising the implement as a unit about some forward axis.

The pitch-compensator cut-out mechanism comprises the shunt unit 65 and associated means directing the hydraulic pressure of the tractor power lift into the front end of the pitch-compensating unit 50 whenever the manual control lever 33 is moved into its transport position, with lost-motion means connecting the shunt valve unit with the control lever 33, whereby movement of the latter does not move the shunt valve out of its normally inactive position (Figure 2) except when the control lever 33 is moved out of its depth-adjusting range and into its lifting or transport range.

The shunt valve unit 65 (Figs. 2 and 3) includes a valve member 170 having a forward end 171 engageable by an arm 172 that is mounted on a shaft 173 upon which the lever 82 is rockably mounted and to which the lever 155 is fixed. The parts are so arranged that the arm 172, with its rounded valve-engaging portion 176, does not engage the end 171 of the valve 170 until the power lift valve control lever 33 of the tractor has been moved into its implement lifting or transport position, as shown in Figure 1. As previously described, the bolt 175 is normally kept tight to cause the lever 82 to move with the arm 155.

The valve member 170 is carried in a bore or chamber 177 in a valve body 178, and a spring 179 (see Figure 2) acts against the closed end of the chamber 177 to hold the valve 170 in a position in which an annular groove 181 therein connects the lines or passageways 62 and 62a. The valve 170 has an external flat or passageway 183 which normally interconnects the passageways 61 and 61a. Thus, in the normal or operating position of the shunt valve unit 65, the ports 69 and 70 are connected directly with the opposite ends of the pitch cylinder 51, subject, of course, to the two check valves 67 and 68. Further, the valve 170 at its inner end includes a passageway 186 normally connecting the demand valve lines 137 and 138 whereby release of the pressure within the demand valve chamber 108, either by operation of the lifting valve 30 or by operation of the pitch cylinder control valve 73, causes the demand valve 101 to close and establish pressure in the system.

Figure 3:
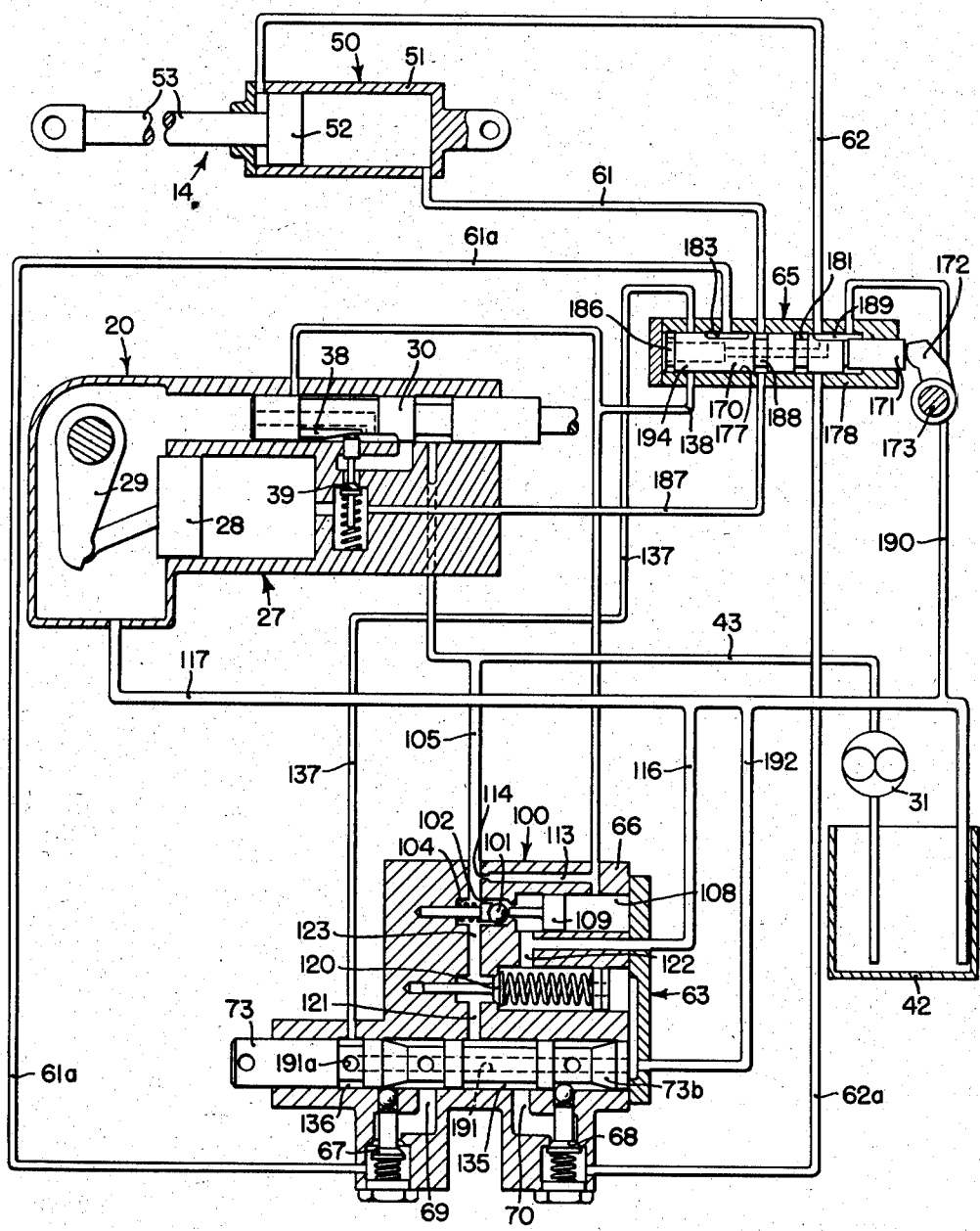
Figure 3 is a view similar to Figure 2, showing the valves and other parts in the positions they occupy when the implement is raised into its transport position.

In operation, whenever the tractor power lift valve control lever 33 is shifted into its implement-raising or transport position, the arm 172 engages the end 171 of the shunt valve 170 and moves the valve into its Fig. 3 position, in which the demand valve lines 137 and 138 are separated from each other, the line or passage 61a is likewise cut off or blocked, and the line 61 is connected directly to the inner end of the lift cylinder 27 by a line or passageway 187 and an annular groove 188 (Figure 3) in the shunt valve member 170. At the same time, the line 62 from the other end of the pitch cylinder 51 is connected via a flat or passage 189 in the valve member 170 with a line 190 leading to the reservoir line 117.

The shunt valve unit 65, when the valve member 170 is in the lift position (Figure 3), thus connects the forward end of the pitch cylinder 51 in parallel with the inner end of the cylinder 27, and the implement can be raised independently of the pitch-compensating mechanism which is now temporarily disabled by the shunt valve member 170, since the lines 61a and 62a, are blocked. Although raising of the implement at this time causes rearward movement of the link 88 to exceed the forward movement of the valve 73 by the spring 91, the overtravel is readily accommodated by the pin 86 and slot 85.

In normal working positions of the hydraulic units (Figure 2), forward movement of the valve 73 would permit fluid to flow from the demand valve cylinder 108 through the lines 139 and 138, the annular port 186 of the shunt valve member 170, the line 137, the groove or chamber 136 in the valve member 73, the valve bores 191a and 191, and the lines 192 and 117 to the reservoir 42, whereby closing of the lift valve 30, as when the implement reaches its raised position, would not result in opening the demand valve 101 and thus the pressure in the line 43 would not be relieved. However, this result is avoided because the inner end 194 of the shunt valve 170 cuts off communication between the lines 137 and 138 as shown in Figure 3. Therefore, even though raising of the implement incurs the forward position of the pitch cylinder control valve 73 to open the line 137 to the reservoir via the chamber 136 and central bore 191, fluid cannot leave the demand valve chamber 108.

Accordingly, when the valve control lever 33 is in a position to raise the implement, the front end of the pitch-compensating cylinder 51 is connected in parallel with the tractor power lift cylinder 27, and the power for lifting the implement is also used to extend the unit 50 in the upper link means 14. The upper link pitch-compensating unit 50 remains extended so long as the implement is in its transport position.

One further advantage, in addition to causing the implement to run out of the ground, of tipping the implement rearwardly, irrespective of the position of the pitch cylinder control valve 73 when the implement is to be raised into its transport position, is that in tipping the implement rearwardly while raising the same, the implement is raised generally parallel to the ground and no energy need be expended in the raising operation to lift the rear end of the implement higher than the front end, as would be the case if the implement were raised as a unit about an axis on or adjacent to the tractor. As soon as the depth control lever 33 is moved out of its implement-raising position and into its depth-adjusting range, the shunt valve member 170 is returned to its normal operating position, as shown in Figure 2, and just as soon as the port 186 in the shunt valve opens communication between the lines 137 and 138, the demand valve 101 closes and pressure rises in the system and oil is directed through the port 70 and lines 62a and 62 to the rear end of the cylinder 51. This retracts the unit 50 and tips the implement forwardly, or downwardly at its forward end, thus materially aiding entry of the tools into the ground, as in the case of a plow.

Another feature of the invention is the independent manual control of the valve 73 by the arm 82 when released from the arm 155 and moved relative thereto. In practice, the auxiliary hand lever 82 may thus be used to provide for a fore-and-aft leveling of the plow for any given position of the other controls for the plow.

A further feature of the mechanism is that, in the case of plows for example, additional entry angle in hard soils can be secured by one of two means, or by a combination of these two means. One way of securing additional entry angle is to move the power lift control valve lever 33 beyond its normal operating position to the maximum lowered position (to the right and below the dotted-line position shown in Figure 1), and then after the plows have entered the ground the lever 33 is brought back to its normal operating position, as indicated generally in dotted lines in Figure 1. Another way of securing additional entry angle would be to move the auxiliary lever 82 separately to its forwardmost position and then return it to normal operating position after the implement is in the soil. To secure the maximum entry angle, both levers 33 and 82 could be moved to their maximum forward positions and then returned to their normal positions when the plows are in the ground.

While we have shown and described above the present invention as incorporated in a particular tractor hydraulic power lift system, it is to be understood that the principles of the present invention, wherein a pitch-compensating mechanism is adjusted for different depths of operation and/or by-passed or cut-out when the implement is to be raised into a transport position, may be incorporated in or associated with different kinds of power-actuated implement raising and adjusting means.

What is claimed is:

1. For use with a tractor and implement outfit, wherein the implement is connected with the tractor by upper and lower link means and the tractor includes a source of hydraulic power, power lift means operated thereby and acting through the lower link means for raising the implement to different operating positions, and a manually shiftable part controlling said power lift means, said power lift means including a valve mechanism to which said shiftable part is connected: the improvement comprising the combination with a hydraulic unit in said upper link means, of controllable means connected with said source of hydraulic power and with said hydraulic unit so as to derive energy from said source of power for operating said hydraulic unit, said controllable means being separate from said valve mechanism, and means connected between said manually shiftable part and said controllable means and actuated by said manually shiftable part for causing said controllable means to operate the hydraulic unit.

2. For use with a tractor and implement outfit, wherein draft linkage including upper and lower link means connects the implement to the tractor for vertical adjustment and for fore-and-aft tilting and the tractor includes a source of hydraulic power and power lift means operated thereby acting through the linkage for raising the implement to different operating positions, and a manually shiftable part for operating said lift means: the improvement comprising the combination with a hydraulic unit connected to and for tilting the implement, of controllable means connected with said source of power and said hydraulic unit and deriving energy from said source of power for operating said hydraulic unit, shunt means movable out of an inoperative position into an operative position and vice-versa, passage means connecting said shunt means with said controllable means and said source, said passage means being disposed so that, in said operative position of the shunt means, said passage means by-passes said controllable means and places said hydraulic unit in communication with said source of hydraulic power independently of said controllable means, and means connected with and actuated by said manually shiftable part for shifting said shunt means.

3. For use with a tractor and implement outfit, wherein draft linkage including upper and lower link means connects the implement to the tractor for vertical adjustment and one of the link means includes means serving as a hydraulic ram for extending and retracting said one link means to increase or decrease the effective length thereof so as to tilt the implement fore-and-aft, wherein the tractor includes hydraulic means for raising and lowering said linkage to raise and lower the implement, and wherein said tractor is provided with control means including a control lever movable through a first range of movement for actuating the raising and lowering means to change the depth of operation of said implement and the control lever is movable through a second range of movement for actuating the raising and lowering means for raising the implement into a transport position: the combination with a valve for optionally holding said hydraulic ram against operation in either direction or operating said ram to extend or retract said one link means, and means connected with the implement and said valve so as to be responsive to changes in the position of the implement relative to said linkage for actuating said valve, of adjusting mechanism connected between said valve and said control lever so as to be responsive to movement of said control lever through its first range of movement for varying the position of said valve for any given position of said implement relative to said linkage, shunt valve means, means operatively connecting said shunt valve means with said valve and said ram and operative in one position to place said ram under control of said hydraulic raising and lowering means for extending said one link means irrespective of the position of said implement relative to said linkage, lost-motion means, and means connecting said lost-motion means with said control lever and with said shunt valve means whereby the latter is operated only by movement of said control lever in its second range of movement.

4. The combination set forth in claim 3, further characterized by said adjusting mechanism comprising a link operatively connected with said control lever, a fulcrum lever, and means connecting said lever with said position-responsive means and said link and operated by said link and supporting at least a portion of said implement position-responsive means, whereby movement of said control lever through said first range of movement changes the neutral position of said valve relative to the corresponding position of said implement relative to said linkage.

5. For use with a tractor and implement outfit, wherein draft linkage including upper and lower link means connects the implement to the tractor for vertical adjustment and for fore-and-aft tilting and the tractor includes lift means connected with said linkage for raising and lowering said implement: the improvement comprising the combination with a piston and cylinder unit connected to and for tilting the implement, a control valve connected with said implement and said linkage so as to be moved in response to tilting of the implement relative to said linkage, of passage means leading from said lift means to said valve, a demand valve incorporated in said passage means and controlling the flow of fluid under pressure therethrough, a shunt valve connected with said lift means and said demand valve between said control valve and said piston and cylinder unit, means for shifting said shunt valve in response to operation of said lift means, and means controlling said demand valve from said shunt valve.

6. For use with a tractor and implement outfit, wherein draft linkage including upper and lower link means connects the implement to the tractor for vertical adjustment and for fore-and-aft tilting and the tractor includes hydraulic lift mechanism connected with said linkage for raising and lowering said implement, said hydraulic lift mechanism including a source of hydraulic pressure, a lift valve, a demand valve interconnected with said lift valve and source of pressure whereby in the neutral position of said lift valve said demand valve relieves pressure in said hydraulic lift mechanism: the combination therewith of a pitch-compensating means incorporated in said linkage and including a ram unit, a pitch-compensating valve movable into and out of a neutral position, means connecting said latter valve with said implement, whereby said pitch-compensating valve moves in response to fore-and-aft tilting of the implement relative to said linkage, and means connecting said pitch-compensating valve with said demand valve whereby in the neutral position of said pitch-compensating valve said demand valve is returned to pressure-relieving position.

7. The combination set forth in claim 6, further characterized by a shunt valve connected between said pitch-compensating valve and said pitch-compensating ram unit whereby in one position of said shunt valve said pitch-compensating valve is by-passed and fluid under pressure is directed into one end of said pitch-compensating ram unit, irrespective of the position of said pitch-compensating valve, and means connected with said demand valve and said shunt valve for controlling said demand valve whereby movement of said lift valve into a neutral position causes said demand valve to open and thereby relieve pressure in said hydraulic mechanism irrespective of the position of the pitch-compensating valve.

8. The combination set forth in claim 6, further characterized by the means connecting the implement with said pitch-compensating valve including lost-motion means, whereby said implement is capable of movement relative to said pitch-compensating valve after the latter has been moved out of its neutral position and into one of its operating positions.

9. The combination set forth in claim 8, further characterized by the means connecting said pitch-compensating valve with the implement including a member pivoted to said pitch-compensating valve and having a slotted portion, a link extending between said implement and said slotted portion, and spring means acting against said member for normally holding said slotted portion against one end of said link, stop means limiting the movement of said member in the direction in which it is urged by said spring means, said link being movable through said slot away from said member after the latter engages said stop means.

10. The combination set forth in claim 9, further characterized by shiftable fulcrum means pivotally connected with and supporting said member, and means connecting said fulcrum means with the hydraulic lift mechanism of the tractor.

11. For use with a tractor and implement outfit, wherein draft linkage including upper and lower link means connects the implement to the tractor for vertical adjustment and for fore-and-aft tilting and the tractor includes hydraulic lift means acting through the linkage for raising the implement to different operating positions, and a manually shiftable part for operating said lift means: the improvement comprising the combination with fore-and-aft tilting means including a hydraulic unit connected to and for extending and retracting one link means, and controllable means for operating said hydraulic unit, of passage means operative to direct fluid to or lead fluid from said hydraulic unit, valve means incorporated in said passage means, means connected with the implement and said valve means and responsive to changes in the position of the tractor relative to the implement for operating said valve means, and means including a manually adjustable part connecting said responsive means with said manually shiftable part, whereby changing the position of said manually adjustable part serves to vary the position of said valve means for any given position of said manually shiftable part.

12. The combination set forth in claim 11, further characterized by the means connecting said responsive means with said manually adjustable part including a member connected to move with said manually shiftable part, a shunt valve connected to be operated by said member, conduit means connected with said hydraulic lift means and said hydraulic unit by-passing said valve means, and means connecting said shunt valve in said conduit means, thereby placing said hydraulic unit in under the sole control of said manually shiftable part.

13. Hydraulically operated control mechanism for changing the position of an implement relative to a tractor, comprising a source of hydraulic pressure, a pair of ram units, one connected to raise the implement into different generally vertical positions and the other connected to tilt the implement about a generally transverse axis relative to the tractor, shiftable valve means for each of said ram units, each of said valve means including a valve member movable into a neutral position from either a ram-extending or ram-retracting position, conduit means leading from said source of fluid pressure to both of said shiftable valve means, a pressure-relieving valve means, means connecting said latter valve means with said conduit means for exhausting fluid therefrom whenever both of said two valve means are in their neutral positions, a shunt valve connected with one of said valve means and with said pressure-relieving valve means and movable into a position preventing the movement of said one valve means into one of its ram-operating positions from closing said pressure-relieving valve means, and means for operating said shunt valve.

14. Hydraulically operated control mechanism for controlling a pair of hydraulic rams, said control mechanism comprising a pair of control valves, each including a valve housing, a valve member movable therein, and inlet and outlet passageways controlled by said valve member, a high-pressure line connected with both of said inlet passageways, conduit means leading from the outlet passageways of said valve housings to said rams, pressure-relieving valve means communicating with said high-pressure line, a piston and cylinder device for controlling said pressure-relieving valve means, means for placing the cylinder of said device in restricted communication with said high-pressure line, whereby said pressure-relieving valve means is opened when fluid under pressure is directed into said cylinder, a pair of conduits extending from said cylinder to both of said valve housings at points thereon adjacent the valve members therein so as to be blocked off when said valve members are in neutral positions in said housings, whereby moving either of said valve members out of its neutral position permits fluid to flow from said cylinder and thus causes said pressure-relieving valve means to close and establish pressure in said pressure line, and a shunt valve interposed in one of said conduits and operable in one position to prevent fluid flow therethrough from said cylinder to the associated control valve, whereby when said shunt valve is in said one position, movement of said associated control valve out of its neutral position does not cause said pressure-relieving valve means to close.

15. Hydraulically operated control mechanism for controlling a pair of hydraulic rams, said control mechanism comprising a pair of control valves, each including a valve housing, a valve member movable therein, and inlet and outlet passageways controlled by said valve member, a high-pressure line connected with both of said inlet passageways, conduit means leading from the outlet passageways of said valve housings to said rams, pressure-relieving valve means communicating with said high-pressure line, a piston and cylinder device for controlling said pressure-relieving valve means, means for placing the cylinder of said device in restricted communication with said high-pressure line, whereby said pressure-relieving valve means is opened when fluid under pressure is directed into said cylinder, a pair of conduits extending from said cylinder to both of said valve housings at points thereon adjacent the valve members therein so as to be blocked off when said valve members are in neutral positions in said housings, whereby moving either of said valve members out of its neutral position permits fluid to flow from said cylinder and thus causes said pressure-relieving valve means to close and establish pressure in said pressure line, a shunt valve interposed in one of said conduits and operable in one position to prevent fluid flow therethrough from said cylinder to the associated control valve, whereby when said shunt valve is in said one position, movement of said associated control valve out of its neutral position does not cause said pressure-relieving valve means to close, and means including ports carried by said shunt valve for placing said two rams in parallel, whereby both are controlled by the other control valve when said shunt valve is in said one position.

16. Hydraulically operated control mechanism for controlling a pair of hydraulic rams, said control mechanism comprising a pair of control valves, each including a valve housing, a valve member movable therein between a neutral position and two end positions, inlet and outlet passageways, and passageways leading to a point of low-pressure discharge, said passageways being opened and closed by movement of said valve members, a high-pressure line connected with both of said inlet passageways, conduit means leading from the outlet passageways of said valve housings to said rams, pressure-relieving valve means communicating with said high-pressure line, a piston and cylinder device for controlling said pressure-relieving valve means, means for placing the cylinder of said device in restricted communication with said high-pressure line, whereby said pressure-relieving valve means is opened when fluid under pressure is directed into said cylinder, a pair of conduits extending from said cylinder to both of said valve housings at points thereon adjacent the valve members therein so as to be blocked off when said valve members are in neutral positions in said housings, conduits leading from said housings to said discharge passageways, whereby moving either of said valve members out of its neutral position permits fluid to flow from said cylinder through the associated valve housing and the associated conduit to said point of low-pressure discharge, thereby causing said pressure-relieving valve means to close and establish pressure in said pressure line, a shunt valve interposed in one of said conduits and operable in one position to prevent fluid flow therethrough from said cylinder to the associated control valve, whereby when said shunt valve is in said one position, movement of said associated control valve out of its neutral position does not cause said pressure-relieving valve means to close, means including ports carried by said shunt valve for placing said two rams in parallel, whereby both are controlled by the other control valve when said shunt valve is in said one position, and means including other ports in said shunt valve providing for flow of fluid from said one control valve to one end of one of said rams and from the other end of said one ram to said point of low-pressure discharge.

17. Hydraulically operated control mechanism for changing the position of an implement relative to a tractor, comprising a source of hydraulic pressure, a pair of ram units, one connected to raise the implement into different generally vertical positions and the other connected to tilt the implement about a generally transverse axis relative to the tractor, shiftable valve means for each of said ram units, each of said valve means including a valve member movable into a neutral position from either a ram-extending or ram-retracting position, conduit means leading from said source of fluid pressure to both of said shiftable valve means, a part moved by the tilting of said implement, means connecting said part to operate the valve means for said other ram unit, shunt valve means incorporated in said conduit means, passage means controlled by said shunt valve means leading from the ram unit that raises said implement to the implement-tilting ram unit, and a part connected to operate said shunt valve means.

18. The invention set forth in claim 17, further characterized by a hand lever connected to operate the valve means for said one ram unit, and means providing a connection between said shunt operating part and said hand lever, whereby movement of the latter into one position serves to shift said shunt valve means.

19. For use with a tractor and implement outfit, wherein the implement is connected with the tractor by upper and lower link means for vertical adjustment and for fore-and-aft tilting and the tractor includes a source of hydraulic power, power lift means operated thereby and acting through one of the link means for adjusting the implement vertically to different operating positions, and a manually shiftable part controlling said power lift means, said power lift means having valve mechanism to which said shiftable part is connected: the improvement comprising the combination with a hydraulic unit separate from the power lift means for tilting the implement fore-and-aft, of controllable means separate from said valve mechanism and connected with said source of hydraulic power and with said hydraulic unit so as to derive energy from said source of power for operating said hydraulic unit, and means connected between said manually shiftable part and said controllable means and actuated by said manually shiftable part for causing said controllable means to operate the hydraulic unit.

20. The invention defined in claim 19 in which the means actuated by said manually shiftable part comprises a member releasably secured to said manually shiftable part for shifting therewith but releasable for independent shifting to control said controllable means independently of said manually shiftable part.

21. For use with a hydraulic power lift mechanism for a tractor and implement outfit, wherein said mechanism includes a source of fluid pressure, implement raising and lowering means, and manually operable means for controlling the flow of fluid to and from said raising and lowering means: the combination of hitch means for connecting the implement with the tractor in draft-transmitting relation, said hitch means including upper and lower links, one of said links being selectively variable in length to enable fore-and-aft tilting of the implement relative to the tractor, adjustable means connected between the tractor and the implement for holding the implement substantially in a given position relative to the ground when the tractor pitches in a generally vertical plane, as when passing over uneven ground, controllable means connected with said source of fluid pressure and with the adjustable means and deriving energy from said source of fluid pressure for adjusting said adjustable means, and means for controlling the controllable means including a manually movable part connecting said raising and lowering means with said controllable means, movement of said part providing for control of said controllable means to effect a manual adjustment of said adjustable means independently of the operation of said raising and lowering means.

22. For use with a tractor and implement outfit, wherein the implement is connected with the tractor by upper and lower link means for vertical adjustment and for fore-and-aft tilting and the tractor includes a source of power, power lift means operated thereby and acting through one of the link means for adjusting the implement vertically to different operating positions, and a manually shiftable part controlling said power lift means, said power lift means having actuating mechanism to which said shiftable part is connected: the improvement comprising the combination with a power unit separate from the power lift means for tilting the implement fore-and-aft, of controllable means separate from said actuating mechanism and connected with said source of power and with said unit so as to derive energy from said source of power for operating said unit, and means connected between said manually shiftable part and said controllable means and actuated by said manually shiftable part for causing said controllable means to operate the power unit.

23. For use with a tractor and implement outfit, wherein the implement is connected with the tractor by upper and lower link means for vertical adjustment and for fore-and-aft tilting and the tractor includes a source of power, power lift means operated thereby and acting through one of the link means for adjusting the implement vertically to different operating positions, and a manually shiftable part controlling said power lift means, said power lift means having actuating mechanism to which said shiftable part is connected: the improvement comprising the combination with a power unit separate from the power lift means for tilting the implement fore-and-aft, of controllable means separate from said actuating mechanism and connected with said source of power and with said unit so as to derive energy from said source of power for operating said unit, a second manually shiftable part operatively connected to the controllable means for causing said controllable means to operate the power unit, and means releasably interconnecting the two shiftable parts for enabling optional joint or independent shifting thereof.

24. For use with a tractor and implement outfit, wherein the implement is connected with the tractor by upper and lower link means for vertical adjustment and for fore-and-aft tilting and the tractor includes a source of power, power lift means operated thereby and acting through one of the link means for adjusting the implement vertically to different operating positions, and a manually shiftable part controlling said power lift means, said power lift means having actuating mechanism to which said shiftable part is connected: the improvement comprising the combination with a power unit separate from the power lift means for tilting the implement fore-and-aft, of controllable means separate from said actuating mechanism and connected with said source of power and with said unit so as to derive energy from said source of power for operating said unit, and a second manually shiftable part operatively connected to the controllable means for causing said controllable means to operate the power unit.

25. For use with a tractor and implement outfit, wherein draft linkage including upper and lower link means connects the implement to the tractor for vertical adjustment and for fore-and-aft tilting and the tractor includes hydraulic lift means acting through the linkage for raising the implement to different operating positions: the improvement comprising the combination with fore-and-aft tilting means including a hydraulic unit connected to and for extending and retracting one link means, and controllable means for operating said hydraulic unit, of passage means operative to direct fluid to or lead fluid from said hydraulic unit, valve means incorporated in said passage means, means connected with the implement and said valve means and responsive to tilting changes in the position of the tractor relative to the implement for operating said valve means, and means including a manually adjustable part separate from the hydraulic lift means and connected to said responsive means whereby changing the position of said manually adjustable part serves to vary responsiveness of the valve means to said responsive means.

26. For use with a hydraulic power lift mechanism for a tractor and implement outfit, wherein said mechanism includes a source of fluid pressure, implement raising and lowering means, and manually operable means for controlling the flow of fluid to and from said raising and lowering means: the combination of hitch means for connecting the implement with the tractor in draft-transmitting relation, said hitch means including upper and lower links, said upper link being selectively variable in length to enable fore-and-aft tilting of the implement relative to the tractor, adjustable means connected between said upper link and the tractor for holding the implement substantially in a given position relative to the ground when the tractor pitches in a generally vertical plane, as when passing over uneven ground, controllable means connected with said source of fluid pressure and with the adjustable means and deriving energy from said source of fluid pressure for adjusting said adjustable means, and means connecting the raising and lowering means and the controllable means for actuating the latter in response to operation of the former, said connecting means including a manually movable part providing for control of said controllable means to effect a manual adjustment of said adjustable means independently of the operation of said raising and lowering means.

27. In a tractor for connection with agricultural implements, the combination of draft linkage trailingly pivoted on the rear end portion of the tractor and having means for pivotal attachment to an implement to arrange the implement for vertical adjustment relative to the tractor, said linkage including provision for fore-and-aft tilting of the implement relative to said linkage and tractor, a lift device on the tractor and connected to the linkage for swinging the implement vertically, a first control actuator disposed to be shifted in response to change in stress in one of said links for causing the lift device to raise or lower the linkage correctively to retain the implement draft load substantially uniform, a pitch-compensating device independent of the lift device and connected to and acting on the implement for selectively holding the implement against fore-and-aft tilting and for correctively effecting such tilting of the implement, a second actuator independent of the first actuator and operative in response to pitching of the tractor relative to the implement for causing the pitch-compensating device to correctively tilt the implement to compensate for said pitching of the tractor and manually operated means for operating the pitch-compensating device independently of the first and second actuators.

28. For use in connecting an implement to a tractor, the improvement comprising link means adapted to be pivotally connected at its ends with said implement and tractor, respectively, for vertical adjustment of the implement relative to the tractor and for fore-and-aft tilting of the implement relative to the tractor, first power means connected between the tractor and the implement for adjusting the implement vertically, second power means independent of the first power means and connected between the tractor and the implement for tilting the implement fore-and-aft, controllable means connected to the second power means independently of the first power means, signal means connected to the controllable means and operative in response to pitching of the tractor relative to the implement for actuating the second power means to forcibly tilt the implement in the corrective direction to compensate for said pitching, and manual means for actuating the second power means independently of the signal means.

References Cited in the file of this patent

UNITED STATES PATENTS

| | | |
|---|---|---|
| 2,455,727 | Bunting | Dec. 7, 1948 |
| 2,715,864 | Kopp | Aug. 23, 1955 |
| 2,755,721 | Rusconi | July 24, 1956 |